United States Patent
Chen

(10) Patent No.: US 11,019,579 B2
(45) Date of Patent: May 25, 2021

(54) POWER CONTROL METHOD AND DEVICE

(71) Applicant: ZTE CORPORATION, Guangdong (CN)

(72) Inventor: Zhongming Chen, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 24 days.

(21) Appl. No.: 16/319,184

(22) PCT Filed: Jun. 13, 2017

(86) PCT No.: PCT/CN2017/088065
§ 371 (c)(1),
(2) Date: Jan. 18, 2019

(87) PCT Pub. No.: WO2018/014677
PCT Pub. Date: Jan. 25, 2018

(65) Prior Publication Data
US 2019/0268859 A1 Aug. 29, 2019

(30) Foreign Application Priority Data
Jul. 21, 2016 (CN) .......................... 201610581437.8

(51) Int. Cl.
*H04W 52/34* (2009.01)
*H04W 36/00* (2009.01)
(Continued)

(52) U.S. Cl.
CPC ..... *H04W 52/346* (2013.01); *H04W 36/0072* (2013.01); *H04W 52/40* (2013.01); *H04W 72/0473* (2013.01)

(58) Field of Classification Search
CPC ........... H04W 36/0069; H04W 52/146; H04W 72/0473; H04W 52/40
(Continued)

(56) References Cited

U.S. PATENT DOCUMENTS

2010/0113051 A1* 5/2010 Du ...................... H04W 74/002
455/450
2013/0070625 A1* 3/2013 Fujishima ............. H04W 36/20
370/252
(Continued)

FOREIGN PATENT DOCUMENTS

| CN | 104349441 A | 2/2015 |
| CN | 104427604 A | 3/2015 |

(Continued)

OTHER PUBLICATIONS

International Search Report for International Application No. PCT/CN2017/088065 dated Aug. 15, 2017.

*Primary Examiner* — John J Lee
(74) *Attorney, Agent, or Firm* — Foley & Lardner LLP

(57) ABSTRACT

A power control method includes: acquiring a power allocation rule; and allocating a transmit power of a UE for each of base stations according to the power allocation rule when receiving a handover instruction or starting to access a target side, and communicating with each of the base stations according to the transmit power; where the base stations include all source base stations before a handover and all target base stations after the handover.

18 Claims, 3 Drawing Sheets

(51) Int. Cl.
*H04W 72/04* (2009.01)
*H04W 52/40* (2009.01)

(58) Field of Classification Search
USPC .................. 455/450, 522, 69, 436, 437, 439
See application file for complete search history.

(56) References Cited

U.S. PATENT DOCUMENTS

2016/0044606 A1* 2/2016 Yin ........................ H04W 52/50
455/450
2017/0164296 A1* 6/2017 Nogami ................ H04W 16/32

FOREIGN PATENT DOCUMENTS

| CN | 105282834 A | 1/2016 |
| CN | 105282847 A | 1/2016 |

* cited by examiner

POWER CONTROL METHOD AND DEVICE

CROSS REFERENCE TO RELATED APPLICATIONS

This is a National Stage Application, filed under 35 U.S.C. 371, of International Patent Application No. PCT/CN2017/088065, filed on Jun. 13, 2017, which claims priority to Chinese patent application No. 201610581437.8 filed on Jul. 21, 2016, contents of both of which are incorporated herein by reference in their entireties.

TECHNICAL FIELD

The present application relates to, but is not limited to, the field of communications and, in particular, relates to a power control method and device.

BACKGROUND

In the long term evolution (LTE) system, a current transmit power of a user equipment (UE) will not exceed the maximum transmit power of the UE. In the existing art, a base station (eNB) allocates the maximum transmit power to the UE, and the UE notifies the eNB of a difference between the maximum transmit power of the UE and a current transmit power of the uplink shared channel (UL-SCH) and physical uplink control channel (PUCC) through a power headroom report (PHR) process. The eNB performs uplink scheduling and link adaptation based on the difference, and further determines whether to perform power control (such as reducing the transmit power or increasing the transmit power, and the amount of power required for adjustment), so as to meet the requirement that the current transmit power of the UE does not exceed the maximum transmit power of the UE and that an optimal receiving effect is achieved at the same time.

After the dual connectivity is introduced into the LTE system, the terminal may maintain connection with two network nodes (e.g., base stations) at the same time. One of the two network nodes is a macro base station called Master eNB (MeNB), and the other network node is a small cell base station called Secondary eNB (SeNB). The base stations respectively allocate the power allocation ratio of the UE for the two base stations to the UE. For example, the MeNB accounts for 60%, and the SeNB accounts for 30%. When the UE actually transmits data, the power control between the two base stations is performed according to this allocation.

In a mobile communication system, in order to ensure the quality of services and provide the user with a good service experience, the UE establishes a connection with the network in a certain cell, and then still needs to measure the signal quality of the serving cell and the neighboring cell and select a suitable cell for the handover, so that mobility requirements are met. The handover process in the existing art is described below. After receiving the handover instruction, a terminal first disconnects the communication with the source base station and then accesses the target base station, which causes the service of the terminal to be interrupted. To avoid this interruption, a technology needs to be introduced so that the data communication is maintained between the terminal and the source base station during the handover process. In this handover process, for how to perform power control, no solution is proposed in the existing art.

SUMMARY

The following is a summary of the subject matter described herein in detail. This summary is not intended to limit the scope of the claims.

In order to solve the above technical problem, embodiments of the present disclosure aim to provide a power control method and device capable of performing power control accurately and effectively during a handover process, so that the service is not interrupted during the handover process and the service quality is ensured.

An embodiment of the present disclosure provides a power control method, including:
  acquiring a power allocation rule; and
  allocating a transmit power of a user equipment (UE) for each of base stations according to the power allocation rule when receiving a handover instruction or starting to access a target side, and communicating with each of the base stations according to the transmit power, where the base stations comprise all source base stations before a handover and all target base stations after the handover.

In an exemplary embodiment, the acquiring a power allocation rule includes receiving one of the following power allocation rules:
  the power allocation rule set by the base stations; and
  a default power allocation rule In an exemplary embodiment, the allocating a transmit power of a user equipment (UE) for each of base stations according to the power allocation rule when receiving a handover instruction or starting to access a target side includes:
  when receiving the handover instruction or starting to access the target side, updating a power allocation mechanism before the handover according to the power allocation rule acquired, and allocating the transmit power of the UE for each of the base stations according to the power allocation rule.

In an exemplary embodiment, after the communicating with each of the base stations according to the transmit power, the method further includes:
  disconnecting communication with the source base stations and adopting a new power allocation rule when a handover process ends; or
  maintaining the communication with the source base stations when the handover process ends, and disconnecting the communication with all source base stations and adopting the new power allocation rule after receiving a disconnection indication transmitted from the target base stations.

An embodiment of the present disclosure further provides a power control method, including:
  setting a power allocation rule of a user equipment (UE) for each of base stations according to a preset rule, where the base stations comprise all source base stations before a handover and all target base stations after the handover; and
  notifying the UE of the power allocation rule.

In an exemplary embodiment, when the base stations merely include at least one first base station or at least one second base station, the setting a power allocation rule of a user equipment (UE) for each of base stations according to a preset rule includes:
  setting a total power shared by the at least one first base station or the at least one second base station; and
  allocating the total power to the at least one first base station or the at least one second base station according to a default ratio, or allocating the total power according to a setting ratio, set for the UE, of the at least one first base station or the at least one second base station In an exemplary embodiment, when the base stations include at least one first base station and at least one second base station, the setting a power allocation rule of a user equipment (UE) for each of base stations according to a preset rule includes:

setting a first total power shared by the at least one first base station and a second total power shared by the at least one second base station respectively; and allocating the first total power and the second total power according to a default ratio respectively, or allocating the first total power and the second total power according to a setting ratio, set for the UE, of the at least one first base station and the at least second base station respectively.

In an exemplary embodiment, when the base stations include at least one first base station and at least one second base station, the setting a power allocation rule of a user equipment (UE) for each of base stations according to a preset rule includes:

setting a third total power and a fourth total power respectively, where the third total power is shared by the at least one first base station and at least one second base station among the source base stations in the base stations, and the fourth total power is shared by the at least one first base station and at least one second base station among the target base stations in the base stations; and allocating the third total power and the fourth total power according to a default ratio respectively, or allocating the third total power and the fourth total power according to a setting ratio, set for the UE, of the at least one first base station and the at least second base station.

In an exemplary embodiment, the setting a power allocation rule of a user equipment (UE) for each of base stations according to a preset rule includes:

setting a power allocation ratio of each of the base stations, and allocating the transmit power of the UE for all base stations according to the power allocation ratio, wherein the power allocation ratio is a default ratio or a setting ratio set for the UE.

An embodiment of the present disclosure further provides a power control device, including:

an acquisition module configured to acquire a power allocation rule;

an allocation module configured to allocate a transmit power of a user equipment (UE) for each of base stations according to the power allocation rule when receiving a handover instruction or starting to access a target side; and a communication module configured to communicate with each of the base stations according to the transmit power, where the base stations comprise all source base stations before a handover and all target base stations after the handover.

In an exemplary embodiment, the acquisition module is configured to receive one of the followings: the power allocation rule set by the base stations; and a default power allocation rule.

In an exemplary embodiment, the allocation module is configured to reallocate the transmit power of the UE for each of the base stations according to the power allocation rule acquired when receiving the handover instruction or starting to access the target side.

In an exemplary embodiment, the device further includes a disconnection module. The disconnection module is configured to:

disconnect communication with the source base stations and adopt a new power allocation rule when a handover process ends; or maintain the communication with the source base stations when the handover process ends, and disconnect the communication with the source base stations and adopt the new power allocation rule after receiving a disconnection indication transmitted from the target base stations.

In an exemplary embodiment, the device further includes:

an update module configured to update a power allocation mechanism before the handover according to the power allocation rule acquired when receiving the handover instruction or starting to access the target side; and the allocation module is configured to allocate the transmit power of the UE for each of the base stations according to the power allocation rule.

An embodiment of the present disclosure further provides a power control device, including:

a setting module configured to set a power allocation rule of a user equipment (UE) for each of base stations according to a preset rule, where the base stations comprise all source base stations before a handover and all target base stations after the handover; and a transmitting module configured to transmit the power allocation rule to the UE.

In an exemplary embodiment, when the base stations merely include at least one first base station or at least one second base station, the setting module is configured to:

set a total power shared by the at least one first base station or the at least one second base station; and allocate the total power to the at least one first base station or the at least second base station according to a default ratio, or allocate the total power according to a setting ratio, set for the UE, of the at least one first base station or the at least one second base station.

In an exemplary embodiment, when the base stations include at least one first base station and at least one second base station, the setting module is configured to:

set a first total power shared by the at least one first base station and a second total power shared by the at least one second base station respectively; and allocate the first total power and the second total power according to a default ratio respectively, or allocate the first total power and the second total power according to a setting ratio, set for the UE, of the at least one first base station and the at least second base station respectively.

In an exemplary embodiment, when the base stations include at least one first base station and at least one second base station, the setting module is configured to:

set a third total power and a fourth total power respectively, where the third total power is shared by the at least one first base station and at least one second base station among the source base stations in the base stations, and the fourth total power is shared by the at least one first base station and at least one second base station among the target base stations in the base stations; and allocate the third total power and the fourth total power according to a default ratio respectively, or allocate the third total power and the fourth total power according to a setting ratio, set for the UE, of the at least one first base station and the at least second base station. In an exemplary embodiment, the setting module is configured to:

set a power allocation ratio of each of the base stations, and allocate the transmit powers of the UE for all base stations according to the power allocation ratio, where the power allocation ratio is a default ratio or a setting ratio set for the UE.

An embodiment of the present disclosure further provides a computer-readable storage medium storing computer-executable instructions, where the computer-executable instructions, when executed, are used for implementing the above-mentioned power control method.

The embodiments of the present disclosure provide a power control method and device. The method includes: acquiring a power allocation rule; and allocating a transmit power of a UE for each of base stations according to the power allocation rule when receiving a handover instruction or starting to access a target side, and communicating with each of the base stations according to the transmit power; where the base stations include all source base stations before a handover and all target base stations after the handover. In the method, the UE obtains the power allocation rule, allocates the transmit power of the UE for each of the base stations according to the power allocation rule at the start of a handover, and then communicates with each of the base stations according to the transmit power, so that the power control can be performed accurately and effectively under the conditions of uninterrupted communication between the UE and the all source base stations in the handover process, and the service quality is ensured.

Other aspects can be understood after the drawings and detailed description are read and understood.

DETAILED DESCRIPTION

Embodiments of the present disclosure will be described below in conjunction with the drawings. It should be noted that if not in collision, the embodiments described herein and the various methods therein may be combined with each other.

It should be noted that the terms "first", "second" and the like described herein are used to distinguish between similar objects and are not necessarily used to describe a particular order or sequence. As used below, the term "module" may be software, hardware or a combination thereof capable of implementing predetermined functions.

The power control method provided by the embodiments of the present disclosure is applicable to the long term evolution (LTE) system, and in particular, to a multi-connectivity technology of the LTE system, that is, the UE communicates with a plurality of base stations at the same time. The power control method is used for allocating the transmit power of the UE for the plurality of base stations during the handover process.

Figure 1:
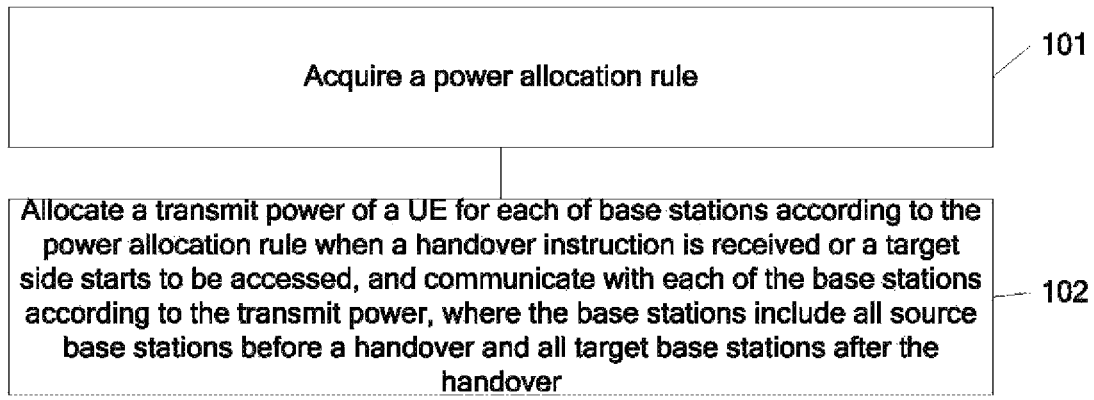
FIG. 1 is a flowchart showing a power control method according to embodiment 1 of the present disclosure.

FIG. 1 is a flowchart showing a power control method according to embodiment 1 of the present disclosure. As shown in FIG. 1, the method includes steps described below.

In step 101, a power allocation rule is acquired.

In this step, the power allocation rule may be acquired by the UE. The power allocation rule may be notified to the UE by the base station through signaling, or a default allocation rule of the UE and the base station.

In step 102, when receiving a handover instruction or starting to access a target side, the UE allocates its transmit power for each of base stations according to the power allocation rule, and communicates with each of the base stations according to the transmit power. The base stations include all source base stations before a handover and all target base stations after the handover.

Optionally, in this step, when receiving the handover instruction or starting to access the target side, the UE allocates the transmit power for all the source base stations and all the target base stations in the handover process according to the power allocation rule acquired in step 101, and communicates with each of these base stations according to the transmit power. In a handover process, the UE does not cut off communication with the source base stations, but controls power allocation according to the power allocation rule so as to communicate with all base stations.

This method may be applied to the UE.

In embodiment 1, the UE allocates the transmit power thereof for each of the base stations according to the power allocation rule acquired when receiving the handover instruction or starting to access the target side, and communicates with each of the base stations according to the transmit power, where the base stations include all source base stations before a handover and all target base stations after the handover. Therefore, during the handover process, the UE establishes communication with the base station after the handover while maintaining communication with the source base stations, so that power control can be performed accurately and effectively during the handover process and the service quality is ensured.

Optionally, the power allocation rule is acquired through receiving the power allocation rule set by the base stations or receiving the default power allocation rule.

Optionally, the UE may acquire the power allocation rule in the following manner. The power allocation rule for the UE is set by the base station, transmitted to the UE through signaling, and obtained by the UE through receiving the signaling. Alternatively, the power allocation rule need not to be set by the base station, and is a default power allocation rule preset by the base station and the UE respectively.

Optionally, the UE allocates, through the following manners, its transmit power for each of the base stations according to the power allocation rule when receiving the handover instruction or starting to access the target side.

When receiving the handover instruction or starting to access the target side, the UE updates a power allocation mechanism before the handover according to the power allocation rule obtained, and allocates the transmit power of the UE for each of the base stations according to the power allocation rule.

In this way, when receiving the handover instruction or starting to access the target side, the UE updates the power allocation mechanism before the handover according to the power allocation rule obtained, so that the UE allocates the transmit power thereof for each of the base stations during the handover process according to the updated power allocation rule to ensure the communication in the handover process.

Optionally, the UE allocates, through the following manners, its transmit power for each of the base stations according to the power allocation rule when receiving the handover instruction or starting to access the target side.

The UE reallocates its transmit power for each of the base stations according to the power allocation rule obtained when receiving the handover instruction or starting to access the target side.

Optionally, after the UE communicates with each of the base stations according to the transmit power, the method further includes the following steps:

disconnecting communication with the source base stations and adopting a new power allocation rule after the handover process ends, or maintaining the communication with the source base stations after the handover process ends, and disconnecting the communication with the source base stations and adopting the new power allocation rule until a disconnection indication transmitted from the target base stations is received.

Optionally, after the handover process ends (that is, when a random access process ends, or when the UE replies a handover completion message), the UE disconnects the communication with the source base stations, and merely communicates with the target base stations being handed over to. Alternatively, after the handover process ends, the UE communicates with the target base stations being handed over to while maintaining the communication with the source base stations. The UE uses the above-mentioned transmit power to communicate with the target base stations, waits for the indication from the target base stations, and disconnects the communication with the source base stations to be handed over after receiving the indication from the target base stations, and communicates with other base stations based on the new power allocation rule.

Figure 2:
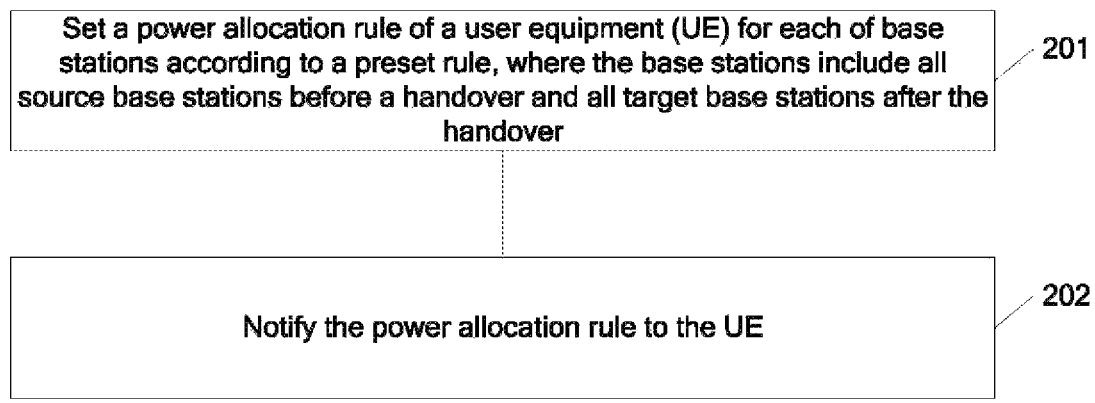
FIG. 2 is a flowchart showing a power control method according to embodiment 2 of the present disclosure.

FIG. 2 is a flowchart showing a power control method according to embodiment 2 of the present disclosure. As shown in FIG. 2, the method includes steps described below.

In step 201, a power allocation rule of a user equipment (UE) for each of base stations is set according to a preset rule, where the base stations include all source base stations before a handover and all target base stations after the handover.

In this step, the UE may currently be in a dual-connectivity state, for example, be in communication with base station 1 and base station 2 simultaneously. Before the handover, the base station 1 set a power allocation rule of the UE for the two base stations according to the preset rule. For example, the percentage of the maximum power of the UE for each base station is set according to the power allocation rule. The UE performs transmit power control between the two base stations according to the allocation percentage. Alternatively, the UE allocates the transmit power thereof for each base station by using a default allocation rule. When deciding to hand over the UE to base station 3 according to a measurement report of the UE, the base station 1 may set the power allocation of the UE for the base station 1, the base station 3 and the base station 2 according to the preset rule. The allocation rule may include, for example, setting a total power of the UE shared by the base station 1 and the base station 3, and allocating the total power according to the default allocation ratio or allocating the total power according to an allocation ratio notified to the UE by the base station, where the default allocation ratio may mean that the total power is allocated equally; or setting allocation rules of all base stations for the UE, where the allocation to each of the base stations is performed according to the allocation rules.

In step 202, the power allocation rule is notified to the UE.

In this step, the base station may notify the UE of the power allocation rule for each base station set in step 201, for example, notify the UE to allocate power according to the default allocation ratio. Alternatively, the base station instructs the UE to allocate power according to a certain allocation ratio. Here, a power allocation table may be provided, and the UE may query the power allocation table to determine power control when communicating with each base station, so as to perform communication with the base station according to the power allocation table.

This method may be applied to the base station.

In the power control method provided by embodiment 2, the power allocation rule of the UE for each base station is set according to the preset rule and notified to the UE, so that the UE may allocate the transmit power according to the rule and communicate with each base station. Therefore, the power control can be performed accurately and effectively under the conditions of uninterrupted communication between the UE and the source base stations in the handover process, and the service quality is ensured.

Optionally, when the base stations merely include at least one first base station or at least one second base station, the power allocation rule of the UE for each of the base stations is set according to the preset rule through steps described below:

setting, by the least one first base station or the second base station, the total power shared by the at least one first base station or the at least one second base station;

allocating the total power to the at least one first base station or the at least second base station according to a default ratio, or according to a setting ratio, set for the UE, of the at least one first base station or the at least one second base station.

Optionally, when the base stations include at least one first base station and at least one second base station, the power allocation rule of the UE for each of the base stations is set according to the preset rule through the following steps:

setting a first total power shared by the at least one first base station and a second total power shared by the at least one second base station respectively; and allocating the first total power and the second total power according to a default ratio respectively, or allocating the first total power and the second total power according to a setting ratio of the at least one first base station and the at least second base station provided for the UE.

Optionally, when the base stations include at least one first base station and at least one second base station, the power allocation rule of the user equipment (UE) for each of the base stations is set according to the preset rule through the following steps:

setting a third total power and a fourth total power respectively, where the third total power is shared by at least one first base station and at least one second base station among the source base stations in the base stations, and the fourth total power is shared by the at least one first base station and at least one second base station among the target base stations in the base stations;

allocating the third total power and the fourth total power according to a default ratio respectively, or allocating the third total power and the fourth total power according to a setting ratio, set for the UE, of the at least one first base station and the at least second base station respectively.

Optionally, the power allocation rule of the user equipment (UE) for each of the base stations is set according to the preset rule through the following step:

setting a power allocation ratio of each of the base stations, and allocating the transmit power of the UE for all base stations according to the power allocation ratio, where the power allocation ratio is a default ratio or a setting ratio set for the UE.

Optionally, the setting the power allocation rule of the UE for each of the base stations according to the preset rule as described in embodiment 1 may include situations described below.

The power allocation between a plurality of (generally two) MeNBs (for example, the above-mentioned first base station) and a plurality of (generally two) SeNBs (for example, the above-mentioned second base station) will be taken as an example and described below.

1) Situation Where there are Merely MeNBs 1.1 A total power shared by the MeNBs is set for the UE, and the total power may be allocated according to a default ratio (e.g., being equally allocated), or according to a set ratio.

1.2 The allocation rules of all base stations are set for the UE. The allocation may be performed according to the default ratio (e.g., being equally allocated) or according to a set ratio.

2) Situation Where there are Merely SeNBs 2.1 A total power shared by the SeNBs is set for the UE, and the total power may be allocated according to a default ratio (e.g., being equally allocated), or according to a set ratio.

2.2 The allocation rules of all base stations are set for the UE. The allocation may be performed according to a default ratio (e.g., being equally allocated) or according to a set ratio.

3) Situation Where there are MeNBs and SeNBs 3.1 A total power shared by a plurality of MeNBs is set for the UE, and may be allocated to the plurality of MeNBs according to a default ratio (e.g., being equally allocated) or according to a set ratio. A total power shared by a plurality of SeNBs is set for the UE, and may be allocated to the plurality of SeNBs according to a default ratio (such as e.g., being equally allocated) or according to a set ratio.

3.2 A allocation rule of all base stations is set for the UE. The allocation may be performed according to a default ratio (e.g., being equally allocated) or according to a set ratio.

Optionally, a total power shared by all base stations on a source side is set for the UE, and a total power shared by all base stations on a target side is set for the UE. Then, the total power shared by all base stations on the source side may be allocated to all the base stations on the source side according to a default ratio (e.g., being equally allocated) or according to a set ratio. The total power shared by all base stations on the target side may be allocated to all the base stations on the target side according to a default ratio (e.g., being equally allocated) or according to a set ratio.

The above-mentioned source side refers to a base station side before the handover, and the target side refers to a base station side after the handover.

A communication process performed through the power control method according to the embodiments of the present disclosure is described by taking embodiments of several different scenarios as an example.

Scenario 1

Figure 3:
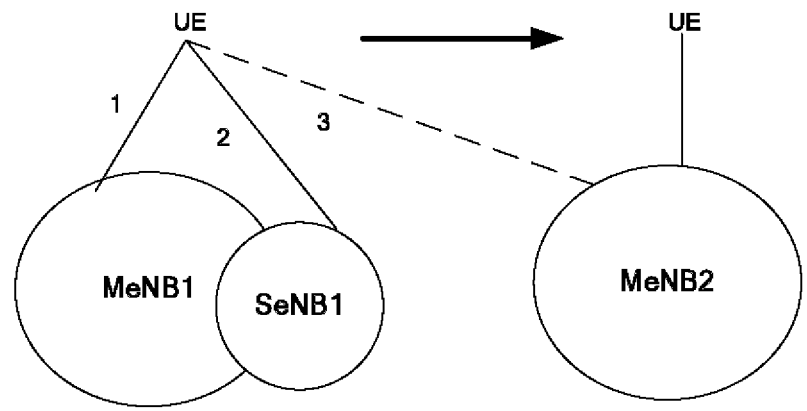
FIG. 3 is a schematic diagram showing scenario 1 in which a UE communicates with a base stations according to an embodiment of the present disclosure.

FIG. 3 is a schematic diagram showing scenario 1 in which a UE communicates with base stations according to an embodiment of the present disclosure. As shown in FIG. 3, a communication process between the UE and the base stations may include steps described below.

Step 1: The UE is currently in a dual-connectivity state, that is, in communication with MeNB1 and SeNB1 simultaneously. The power allocation between the two base stations is set for the UE by MeNB1, where percentages of the maximum power of the UE for the two base stations are shown in Table 1-1. The UE performs the transmit power control between the two base stations according to the allocation ratio, that is, 60% of the maximum power of the UE is used for MeNB1, and 30% of the maximum power of the UE is used for SeNB1.

TABLE 1-1

|  | MeNB1 | SeNB1 |
| --- | --- | --- |
| Power allocation | 60% | 30% |

Step 2: According to a measurement report of the UE, MeNB1 decides and notifies the UE that the UE is to be handed over to MeNB2 and the commutation with SeNB1 is not reserved. The power allocation in the handover process is shown in Table 1-2-1 or Table 1-2-2. Since the UE only communicates with MeNB2 after the handover ends, it is not necessary to set power control between the base stations.

TABLE 1-2-1

|  | MeNB1 + MeNB2 | SeNB1 |
| --- | --- | --- |
| Power allocation | 70% | 20% |

TABLE 1-2-2

|  | MeNB1 | MeNB2 | SeNB1 |
| --- | --- | --- | --- |
| Power allocation | 30% | 40% | 20% |

Step 3: According to Table 1-2-1, 70% of the power may be allocated to MeNB1 and MeNB2 according to a default ratio, e.g., being equally allocated, that is, 35% of the power is used for each base station. Alternatively, MeNB1 notifies the UE of an allocation ratio between MeNB1 and MeNB2, for example, 40% of 70% of the maximum power of the UE is used for MeNB1, and 60% of 70% of the maximum power of the UE is used for MeNB2.

According to Table 1-2-2, for MeNB1, SeNB1 and MeNB2, 30% of the maximum power of the UE is used for MeNB1, 40% of the maximum power of the UE is used for MeNB2, and 20% of the maximum power of the UE is used for SeNB1 according to the power allocation ration in the table. This allocation ratio may be a default rule or be set for the terminal by the base station.

Step 4: Before receiving a handover instruction, the UE communicates with the base stations based on the power allocation in Table 1-1. After receiving the handover instruction, the UE maintains communication with MeNB1 and SeNB1, establishes a connection with MeNB2 simultaneously, and communicates with the base stations based on the power allocation in Table 1-2-1 or Table 1-2-2.

Step 5: After the handover process ends (i.e., when a random access process ends, or when the UE replies a handover completion message), the UE disconnects the communication with MeNB1 and SeNB1, and merely communicates with MeNB2. In this case, power control between base stations is not needed.

Alternatively, after the handover process ends, the UE communicates with MeNB2 while maintaining communication with MeNB1 and SeNB1. The UE communicates with the base stations based on the power allocation in Table 1-2-1 or Table 1-2-2, and waits for an indication from the base stations. When the indication from the base stations is received, the UE disconnects the communication with MeNB1 and SeNB1, and merely communicates with MeNB2. In this case, power control between base stations is not needed.

Scenario 2

Figure 4:
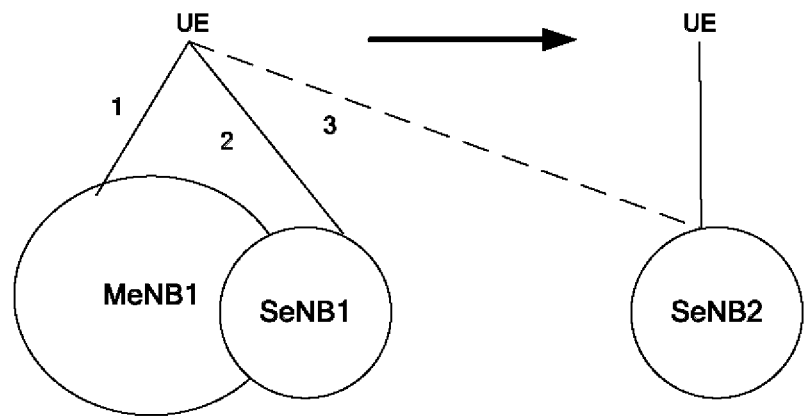
FIG. 4 is a schematic diagram showing scenario 2 in which a UE communicates with a base stations according to an embodiment of the present disclosure.

FIG. 4 is a schematic diagram showing scenario 2 in which a UE communicates with base stations according to an embodiment of the present disclosure. As shown in FIG. 4, a communication process between the UE and the base stations may include steps described below.

Step 1: The UE is currently in a dual-connectivity state, that is, in communication with MeNB1 and SeNB1 simultaneously. The power allocation between the two base stations is set for the UE by MeNB1, where percentages of the maximum power of the UE for the two base stations are shown in Table 2-1. The UE performs the transmit power control between the two base stations according to an allocation ratio shown in Table 2-1, that is, 65% of the maximum power of the UE is used for MeNB1, and 30% of the maximum power of the UE is used for SeNB1.

TABLE 2-1

|  | MeNB1 | SeNB1 |
| --- | --- | --- |
| Power allocation | 65% | 30% |

Step 2: According to a measurement report of the UE, MeNB1 decides and notifies the UE that the UE is to be handed over to SeNB2 from SeNB1. The power allocation in the handover process is shown in Table 2-2-1 or Table 2-2-2, and the power allocation after the handover ends is shown in Table 2-3.

TABLE 2-2-1

|  | MeNB1 | SeNB1 + SeNB2 |
| --- | --- | --- |
| Power allocation | 50% | 50% |

TABLE 2-2-2

|  | MeNB1 | SeNB1 | SeNB2 |
| --- | --- | --- | --- |
| Power allocation | 50% | 20% | 30% |

TABLE 2-3

|  | MeNB1 | SeNB2 |
| --- | --- | --- |
| Power allocation | 70% | 20% |

Step 3: According to Table 2-2-1, 50% of the power may be allocated to SeNB1 and SeNB2 according to a default ratio, e.g., being equally allocated, that is, 25% of the power is used for each base station. Alternatively, MeNB1 notifies the UE of an allocation ratio between SeNB1 and SeNB2, for example, 40% of 50% of the maximum power of the UE is used for SeNB1, and 60% of 50% of the maximum power of the UE is used for SeNB2.

According to Table 2-2-2, for MeNB1, SeNB1 and SeNB2, the power is allocated according to a set ratio. For example, 50% of the maximum power of the UE is used for MeNB1, 20% of the maximum power of the UE is used for SeNB1, and 30% of the maximum power of the UE is used for SeNB2. Alternatively, the power of the UE is allocated according to a default allocation ratio such as 4:3:3, that is, 40% of the maximum power of the UE is used for MeNB1, 30% of the maximum power of the UE is used for SeNB1, and 30% of the maximum power of the UE is used for SeNB2.

Step 4: Before receiving a handover instruction, the UE communicates with the base stations based on the power allocation in Table 2-1. After receiving the handover instruction, the UE establishes a connection with SeNB2 while maintaining communication with MeNB1 and SeNB1, and communicates with the base stations based on the power allocation in Table 2-2-1 or Table 2-2-2.

Step 5: After a handover process ends, the UE disconnects the communication with SeNB1, communicates with SeNB2, and communicates with the base stations based on the power allocation in Table 2-3.

Alternatively, after the handover process ends, the UE communicates with SeNB2 while maintaining communication with SeNB1. The UE communicates with the base stations based on the power allocation in Table 2-2-1 or Table 2-2-2, and waits for an indication from the base stations. When receiving the indication from the base stations, the UE disconnects the communication with SeNB1, and communicates with the base stations based on the power allocation in Table 2-3.

Scenario 3

Figure 5:
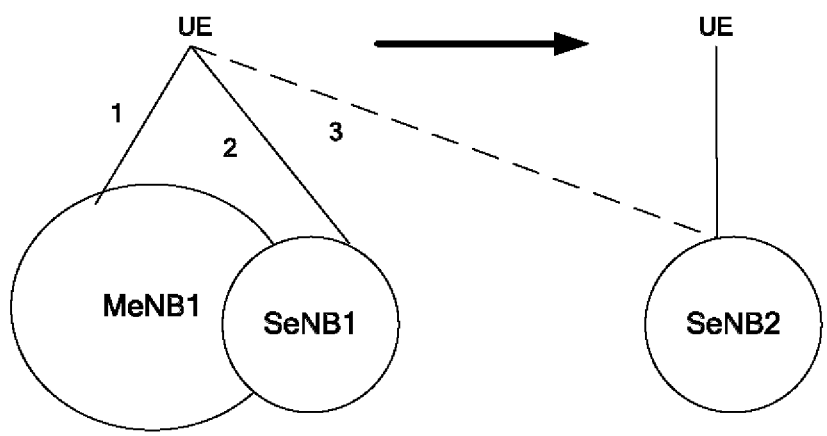
FIG. 5 is a schematic diagram showing scenario 3 in which a UE communicates with a base stations according to an embodiment of the present disclosure.

FIG. 5 is a schematic diagram showing scenario 3 in which a UE communicates with base stations according to an embodiment of the present disclosure. As shown in FIG. 5, a communication process between the UE and the base stations may include steps described below.

Step 1: The UE is currently in a dual-connectivity state, that is, in communication with MeNB1 and SeNB1 simultaneously. The power allocation between the two base stations is set for the UE by MeNB1, where percentages of the maximum power of the UE for the two base stations are shown in Table 3-1. The UE performs the transmit power control between the two base stations according to an allocation ratio shown in Table 3-1, that is, 70% of the maximum power of the UE is used for MeNB1, and 30% of the maximum power of the UE is used for SeNB1.

TABLE 3-1

|  | MeNB1 | SeNB1 |
|---|---|---|
| Power allocation | 70% | 30% |

Step 2: According to a measurement report of the UE, MeNB1 decides and notifies the UE that the UE is to be handed over from MeNB1 to MeNB2 and to be handed over from SeNB1 to SeNB2 respectively. The power allocation in the handover process is shown in Table 3-2-1 or Table 3-2-2, and the power allocation after the handover ends is shown in Table 3-3.

TABLE 3-2-1

|  | MeNB1 + MeNB2 | SeNB1 + SeNB2 |
|---|---|---|
| Power allocation | 60% | 40% |

TABLE 3-2-2

|  | MeNB1 | SeNB1 | MeNB2 | SeNB2 |
|---|---|---|---|---|
| Power allocation | 30% | 20% | 30% | 20% |

TABLE 3-3

|  | MeNB2 | SeNB2 |
|---|---|---|
| Power allocation | 65% | 20% |

Step 3: According to Table 3-2-1, for MeNB1 and MeNB2, the power may be allocated according to a default allocation rule such as 4:6, that is, 40% of 60% of the maximum power of the UE is allocated to MeNB1 and 60% of 60% of the maximum power of the UE is allocated to MeNB2. Alternatively, MeNB1 notifies the UE of an allocation ratio between MeNB1 and MeNB2, for example, 45% of 60% of the maximum power of the UE is used for MeNB1, and 55% of 60% of the maximum power of the UE is used for MeNB2.

According to Table 3-2-1, 40% of the power may be allocated to SeNB1 and SeNB2 according to a default ratio (e.g., being equally allocated), that is, 20% of the power is used for each base station. Alternatively, MeNB1 notifies the UE of an allocation ratio between SeNB1 and SeNB2, for example, 40% of 40% of the maximum power of the UE is used for SeNB1, and 60% of 40% of the maximum power of the UE is used for SeNB2.

According to Table 3-2-2, for MeNB1, SeNB1, MeNB2 and SeNB2, the power is allocated according to a set ratio. For example, 30% of the maximum power of the UE is used for MeNB1, 20% of the maximum power of the UE is used for SeNB1, 30% of the maximum power of the UE is used for MeNB2, and 20% of the maximum power of the UE is used for SeNB2. Alternatively, the power is allocated according to a default ratio allocation rule such as 25:25:35:15, that is, 25% of the maximum power of the UE is used for MeNB1, 25% of the maximum power of the UE is used for SeNB1, 35% of the maximum power of the UE is used for MeNB2, and 15% of the maximum power of the UE is used for SeNB2.

Step 4: Before receiving a handover instruction, the UE communicates with the base stations based on the power allocation in Table 3-1. After receiving the handover instruction, the UE establishes connections with MeNB2 and SeNB2 while maintaining communication with MeNB1 and SeNB1, and communicates with the base stations based on the power allocation in Table 3-2-1 or Table 3-2-2.

Step 5: After the handover process ends, the UE disconnects the communication with MeNB1 and SeNB1, and communicates with MeNB2 and SeNB2. The UE communicates with the base stations based on the power allocation in Table 3-3.

Alternatively, after the handover process ends, the UE communicates with MeNB2 and SeNB2 while maintaining communication with MeNB1 and SeNB1. The UE communicates with the base stations based on the power allocation in Table 3-2-1 or Table 3-2-2, and waits for an indication from the base stations. After receiving the indication from the base stations, the UE disconnects the communication with MeNB1 and SeNB1, and communicates with the base stations based on the power allocation in Table 3-3.

Scenario 4

This scenario is the same as the scenario 3, except for the power allocation rule in the communication process. As shown in FIG. 5, the communication process may include steps described below.

Step 1: The UE is currently in a dual-connectivity state and in communication with MeNB1 and SeNB1 simultaneously. The power allocation between the two base stations is set for the UE by MeNB1, where percentages of the maximum power of the UE for the two base stations are shown in Table 4-1. The UE performs the transmit power control between the two base stations according to an allocation ratio in Table 4-1, that is, 70% of the maximum power is used for MeNB1, and 30% of the maximum power is used for SeNB1.

TABLE 4-1

|  | MeNB1 | SeNB1 |
|---|---|---|
| Power allocation | 70% | 30% |

Step 2: According to a measurement report of the UE, MeNB1 decides and notifies the UE that the UE is to be handed over from MeNB1 to MeNB2 and to be handed over from SeNB1 to SeNB2 respectively. The power allocation in the handover process is shown in Table 4-2-1, and the power allocation after the handover ends is shown in Table 4-3.

TABLE 4-2-1

|  | MeNB1 + SeNB1 | MeNB2 + SeNB2 |
|---|---|---|
| Power allocation | 60% | 40% |

TABLE 4-3

|  | MeNB2 | SeNB2 |
|---|---|---|
| Power allocation | 65% | 20% |

Step 3: According to Table 4-2-1, for MeNB1 and SeNB1, the power is allocated according to a default ratio allocation rule such as 6:4, that is, 60% of 60% of the maximum power is used for MeNB1 and 40% of 60% of the maximum power is used for SeNB1. Alternatively, MeNB1 notifies the UE of an allocation ratio between MeNB1 and the SeNB1, for example, 55% of 60% of the maximum power of the UE is used for MeNB1, and 45% of 60% of the maximum power of the UE is used for SeNB1.

According to Table 4-2-1, for MeNB2 and SeNB2, 40% of the power is allocated according to a default ratio, e.g., being equally allocated, that is, 20% of the power is used for each base station. Alternatively, MeNB1 notifies the UE of an allocation ratio between MeNB2 and SeNB2, for example, 60% of 40% of the maximum power of the UE is used for MeNB2, and 40% of 40% of the maximum power of the UE is used for SeNB2.

Step 4: Before receiving a handover instruction, the UE communicates with the base stations based on the power allocation in Table 4-1. After receiving the handover instruction, the UE establishes connections with MeNB2 and SeNB2 while maintaining communication with MeNB1 and SeNB1, and communicates with the base stations based on the power allocation in Table 4-2-1.

Step 5: After the handover process ends, the UE disconnects the communication with MeNB1 and SeNB1, and communicates with MeNB2 and SeNB2 based on the power allocation in Table 4-3.

Alternatively, after the handover process ends, the UE communicates with MeNB2 and SeNB2 while maintaining communication with MeNB1 and SeNB1. The UE communicates with the base stations based on the power allocation in Table 4-2-1, and waits for an indication from the base stations. After receiving the indication from the base stations, the UE disconnects the communication with MeNB1 and SeNB1, and communicates with the base stations based on the power allocation in Table 4-3.

Figure 6:
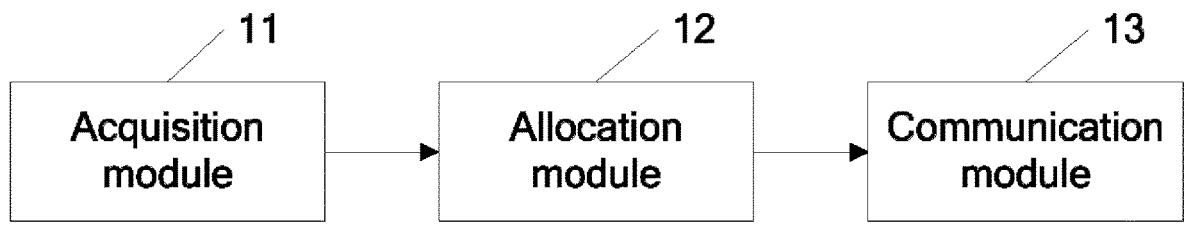
FIG. 6 is a structural diagram showing a power control device according to embodiment 1 of the present disclosure.

FIG. 6 is a structural diagram showing a power control device according to embodiment 1 of the present disclosure. As shown in FIG. 6, the device includes an acquisition module 11, an allocation module 12 and a communication module 13.

The acquisition module 11 is configured to acquire a power allocation rule.

The allocation module 12 is configured to allocate a transmit power of a UE for each of base stations according to the power allocation rule when a handover instruction is received or a target side starts to be accessed.

The communication module 13 is configured to communicate with each of the base stations according to the transmit power. The base stations include all source base stations before a handover and all target base stations after the handover.

The power control device of the embodiment may be a device embodiment corresponding to the power control method provided in embodiment 1. The principles and effects are similar, and details are not described herein again.

Optionally, the acquisition module 11 is configured to receive the power allocation rule set by the base station or receive a default power allocation rule.

Optionally, the allocation module 12 is configured to reallocate the transmit power of the UE for each of the base stations according to the power allocation rule acquired when the handover instruction is received or the target side starts to be accessed.

Figure 7:
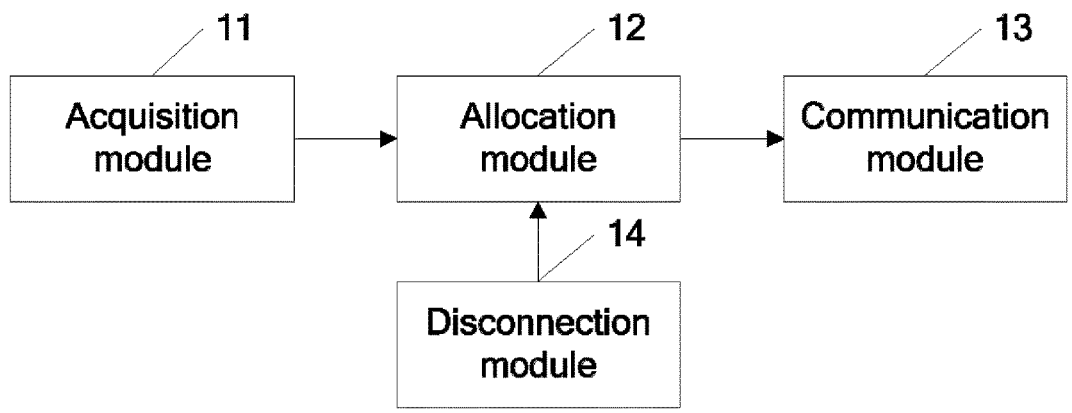
FIG. 7 is a structural diagram showing a power control device according to an optional embodiment of embodiment 1 of the present disclosure.

FIG. 7 is a structural diagram showing a power control device according to an optional implementation of embodiment 1 of the present disclosure. As shown in FIG. 7, the device may further include a disconnection module 14.

The disconnection module 14 is configured to disconnect communication with the source base station and adopt a new power allocation rule when a handover process ends.

Alternatively, the disconnection module 14 is configured to maintain the communication with the source base station when the handover process ends, and disconnect the communication with the source base station and adopt the new power allocation rule after receiving a disconnection instruction transmitted from the target base station.

Figure 8:
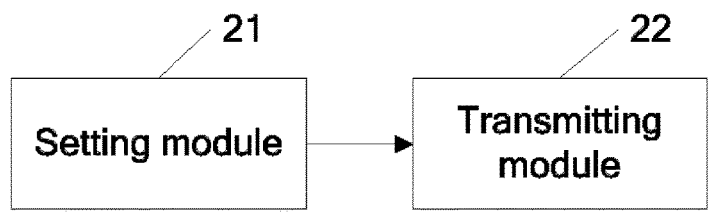
FIG. 8 is a structural diagram showing a power control device according to embodiment 2 of the present disclosure.

FIG. 8 is a structural diagram showing a power control device according to embodiment 2 of the present disclosure. As shown in FIG. 8, the device includes a setting module 21 and a transmitting module 22.

The setting module 21 is configured to set a power allocation rule of a user equipment (UE) for each of base stations according to a preset rule, where the base stations include all source base stations before a handover and all target base stations after the handover.

The transmitting module 22 is configured to transmit the power allocation rule to the UE.

The power control device of the embodiment may be a device embodiment corresponding to the power control method provided in embodiment 2. The principles and effects are similar, and details are not described herein again.

Optionally, when the base stations merely include at least one first base station or at least one second base station, the setting module 21 is configured to:
  set a total power shared by the at least one first base station or the at least one second base station; and
  allocate the total power to the at least one first base station or the at least second base station according to a default ratio, or according to a setting ratio, set for the UE, of the at least one first base station or the at least one second base station.

Optionally, when the base stations include at least one first base station and at least one second base station, the setting module 21 is configured to:
  set a first total power shared by the at least one first base station and a second total power shared by the at least one second base station respectively; and
  allocate the first total power and the second total power according to a default ratio respectively, or according to a setting ratio, set for the UE, of the at least one first base station and the at least second base station.

Optionally, when the base stations include at least one first base station and at least one second base station, the setting module 21 is configured to:
  set a third total power and a fourth total power respectively, where the third total power is shared by the at least one first base station and at least one second base station among the source base stations in the base stations, and the fourth total power is shared by the at least one first base station and at least one second base station among the target base stations in the base stations; and
  allocate the third total power and the fourth total power according to a default ratio respectively, or according to a setting ratio, set for the UE, of the at least one first base station and the at least second base station.

Optionally, the setting module 21 is configured to:
  set a power allocation ratio of each of the base stations, and allocate the transmit power of the UE for all base stations according to the power allocation ratio, where the power allocation ratio is a default ratio or a setting ratio set for the UE.

In practical applications, the acquisition module 11, the allocation module 12, the communication module 13, the disconnection module 14, the setting module 21, and the transmitting module 22 may all be implemented by a central processing unit (CPU), microprocessor unit (MPU), digital signal processor (DSP), or field programmable gate array (FPGA) located in the terminal.

An embodiment of the present disclosure further provides a computer-readable storage medium storing computer-executable instructions, where the computer-executable instructions, when executed, are used for implementing the above-mentioned power control method.

It is to be understood by those skilled in the art that the embodiments of the present disclosure may be provided as methods, systems or computer program products. Therefore, the embodiments of the present disclosure may take the form of a hardware embodiment, a software embodiment, or an embodiment with a combination of software and hardware. The embodiments of the present disclosure may take the form of a computer program product implemented in one or more computer-usable storage media (including, but not limited to, a disk memory and an optical memory) that includes computer-usable program codes.

The embodiments of the present disclosure may be described with reference to flowcharts and/or block diagrams of methods, devices (systems) and computer program products according to the embodiments of the present disclosure. It should be understood that each flow and/or block in the flowcharts and/or block diagrams and a combination of flows and/or blocks in the flowcharts and/or block diagrams are implemented by computer program instructions. These computer program instructions can be provided to a general-purpose computer, a special-purpose computer, an embedded processor or a processor of another programmable data processing device to produce a machine, so that instructions executed by a computer or a processor of another programmable data processing device produce an device for implementing the functions specified in one or more flows in the flowcharts and/or one or more blocks in the block diagrams.

These computer program instructions can also be stored in a computer-readable memory which can direct a computer or other programmable data processing devices to operate in a particular manner so that the instructions stored in the computer-readable memory produce a manufactured product including an instruction device. The instruction device implements the functions specified in one or more flows in the flowcharts and/or one or more blocks in the block diagrams.

These computer program instructions can also be loaded onto a computer or other programmable data processing devices so that a series of operation steps are performed on the computer or other programmable devices to produce processing implemented by a computer. Therefore, instructions executed on a computer or other programmable devices provide steps for implementing the functions specified in one or more flows in the flowcharts and/or one or more blocks in the block diagrams.

It should be understood by those of ordinary skill in the art that all or part of the steps in the above-mentioned embodiments may be implemented by using one or more computer programs. The computer programs may be stored in a computer-readable storage medium and executed on a corresponding hardware platform (e.g., system, device, apparatus, component or processor). During the execution of these programs, one of or a combination of the steps in the above-mentioned method embodiments is implemented.

Optionally, all or part of the steps in the above-mentioned embodiments may also be implemented by using one or more integrated circuits. These steps may be made into integrated circuit modules separately, or part of these modules or steps may be made into a single integrated circuit module for implementation.

The devices/functional modules/functional units in the above-mentioned embodiments may be implemented on a general-purpose computing device. They may be concentrated on a single computing device or distributed over a network composed of multiple computing devices.

The devices/functional modules/functional units in the above-mentioned embodiments are implemented by software functional modules, and can be stored in a computer-readable storage medium when sold or used as independent products. The above-mentioned computer-readable storage medium may be a read-only memory, a magnetic disk, an optical disk, or the like. It should be understood by those of ordinary skill in the art that modifications or equivalent substitutions on the technical solutions of the present application may be made without departing from the spirit and scope of the technical solutions of the present application. The protection scope of the present disclosure is defined by the appended claims.

INDUSTRIAL APPLICABILITY

The embodiments of the present disclosure provide a power control method and device. The method includes: acquiring a power allocation rule; allocating a transmit power of a UE for each of base stations according to the power allocation rule and communicating with each of the base stations according to the transmit power when receiving a handover instruction or starting to access a target side; where the base stations include all source base stations before a handover and all target base stations after the handover. In the method, the UE acquires the power allocation rule, and allocates the transmit power of the UE for each of the base stations according to the power allocation rule to communicate with each of the base stations according to the transmit power at the start of a handover. Therefore, the power control can be performed accurately and effectively without disconnecting the communication between the UE and the source base stations in the handover process, and the service quality is ensured.

What is claimed is:
1. A power control method, comprising:
acquiring a power allocation rule, wherein the power allocation rule is used for allocating transmit power for all source base stations and all target base stations in a handover process of a user equipment (UE); and
allocating a transmit power of the UE for each of base stations according to the power allocation rule when receiving a handover instruction or starting to access a target side, and communicating with each of the base stations according to the transmit power, wherein the base stations comprise the all source base stations before the handover and the all target base stations after the handover, and during the handover process, the UE establishes communication with the all target base stations while maintaining communication with the all source base stations.
2. The method according to claim 1, wherein the acquiring the power allocation rule comprises receiving one of the following power allocation rules:
the power allocation rule set by the base stations; and
a default power allocation rule.
3. The method according to claim 1, wherein the allocating the transmit power of the UE for each of base stations according to the power allocation rule when receiving the handover instruction or starting to access the target side comprises:

reallocating the transmit power of the UE for each of the base stations according to the power allocation rule acquired when receiving the handover instruction or starting to access the target side.

4. The method according to claim 1, wherein after the communicating with each of the base stations according to the transmit power, the method further comprises at least one of the followings:

disconnecting communication with the source base stations and adopting a new power allocation rule when a handover process ends; and maintaining the communication with the source base stations when the handover process ends, and disconnecting the communication with the source base stations and adopting the new power allocation rule after receiving a disconnection indication transmitted from the target base stations.

5. A power control method, comprising:

setting a power allocation rule of a user equipment (UE) for each of base stations according to a preset rule, wherein the base stations comprise all source base stations before a handover and all target base stations after the handover, and wherein the power allocation rule is used for allocating transmit power for the all source base stations and the all target base stations in a handover process of the UE, and during the handover process, the UE establishes communication with the all target base stations while maintaining communication with the all source base stations; and notifying the UE of the power allocation rule.

6. The method according to claim 5, wherein when the base stations merely comprise at least one first base station or at least one second base station, the setting the power allocation rule of the UE for each of base stations according to the preset rule comprises:

setting a total power shared by the at least one first base station or the at least one second base station; and allocating the total power to the at least one first base station or the at least one second base station according to a default ratio, or allocating the total power according to a setting ratio, set for the UE, of the at least one first base station or the at least one second base station.

7. The method according to claim 5, wherein when the base stations comprise at least one first base station and at least one second base station, the setting the power allocation rule of the UE for each of base stations according to the preset rule comprises:

setting a first total power shared by the at least one first base station and a second total power shared by the at least one second base station respectively; and allocating the first total power and the second total power according to a default ratio respectively, or allocating the first total power and the second total power according to a setting ratio, set for the UE, of the at least one first base station and the at least second base station respectively.

8. The method according to claim 5, wherein when the base stations comprise at least one first base station and at least one second base station, the setting the power allocation rule of the UE for each of base stations according to the preset rule comprises:

setting a third total power and a fourth total power respectively, wherein the third total power is shared by the at least one first base station and at least one second base station among the source base stations in the base stations, and the fourth total power is shared by the at least one first base station and at least one second base station among the target base stations in the base stations; and allocating the third total power and the fourth total power according to a default ratio respectively, or allocating the third total power and the fourth total power according to a setting ratio, set for the UE, of the at least one first base station and the at least second base station.

9. The method according to claim 5, wherein the setting the power allocation rule of the UE for each of base stations according to the preset rule comprises:

setting a power allocation ratio of each of the base stations, and allocating the transmit power of the UE for all base stations according to the power allocation ratio, wherein the power allocation ratio is a default ratio or a setting ratio set for the UE.

10. A power control device, comprising a processor and a storage device for storing computer executable instructions that when executed by the processor cause the processor to perform:

acquiring a power allocation rule, wherein the power allocation rule is used for allocating transmit power for all source base stations and all target base stations in a handover process of a user equipment (UE);

allocating a transmit power of the for each of base stations according to the power allocation rule when receiving a handover instruction or starting to access a target side, and communicating with each of the base stations according to the transmit power, wherein the base stations comprise the all source base stations before the handover and the all target base stations after the handover, and during the handover process, the UE establishes communication with the all target base stations while maintaining communication with the all source base stations.

11. The device according to claim 10, wherein the processor is configured to receive one of the followings: the power allocation rule set by the base stations; and a default power allocation rule.

12. The device according to claim 10, wherein the processor is configured to:

reallocate the transmit power of the UE for each of the base stations according to the power allocation rule acquired when receiving the handover instruction or starting to access the target side.

13. The device according to claim 10, wherein the processor is further configured to:

disconnect communication with the source base stations and adopt a new power allocation rule when a handover process ends; or maintain the communication with the source base stations when the handover process ends, and disconnect the communication with the source base stations and adopt the new power allocation rule after receiving a disconnection indication transmitted from the target base stations.

14. A power control device, comprising a processor and a storage device for storing computer executable instructions that when executed by the processor cause the processor to perform the power control method according to claim 5:

setting a power allocation rule of a user equipment (UE) for each of base stations according to a preset rule, wherein the base stations comprise all source base stations before a handover and all target base stations after the handover, and wherein the power allocation rule is used for allocating transmit power for the all source base stations and the all target base stations in a handover process of the UE, and during the handover process, the UE establishes communication with the all target base stations while maintaining communication with the all source base stations; and notifying the UE of the power allocation rule.

15. The device according to claim 14, wherein when the base stations merely comprise at least one first base station or at least one second base station, the processor is configured to:

set a total power shared by the at least one first base station or the at least one second base station; and allocate the total power to the at least one first base station or the at least second base station according to a default ratio, or allocate the total power according to a setting ratio, set for the UE, of the at least one first base station or the at least one second base station.

16. The device according to claim 14, wherein when the base stations comprise at least one first base station and at least one second base station, the processor is configured to:

set a first total power shared by the at least one first base station and a second total power shared by the at least one second base station respectively; and allocate the first total power and the second total power according to a default ratio respectively, or allocate the first total power and the second total power according to a setting ratio, set for the UE, of the at least one first base station and the at least second base station respectively.

17. The device according to claim 14, wherein when the base stations comprise at least one first base station and at least one second base station, the processor is configured to:

set a third total power and a fourth total power respectively, wherein the third total power is shared by the at least one first base station and at least one second base station among the source base stations in the base stations, and the fourth total power is shared by the at least one first base station and at least one second base station among the target base stations in the base stations; and allocate the third total power and the fourth total power according to a default ratio respectively, or allocate the third total power and the fourth total power according to a setting ratio, set for the UE, of the at least one first base station and the at least second base station.

18. The device according to claim 14, wherein the processor is configured to:

set a power allocation ratio of each of the base stations, and allocate the transmit power of the UE for all base stations according to the power allocation ratio, wherein the power allocation ratio is a default ratio or a setting ratio set for the UE.

* * * * *